Sept. 14, 1954  W. RICHTER  2,688,904
INDEXING MECHANISM FOR MACHINE TOOLS
Filed Feb. 23, 1946  3 Sheets-Sheet 1
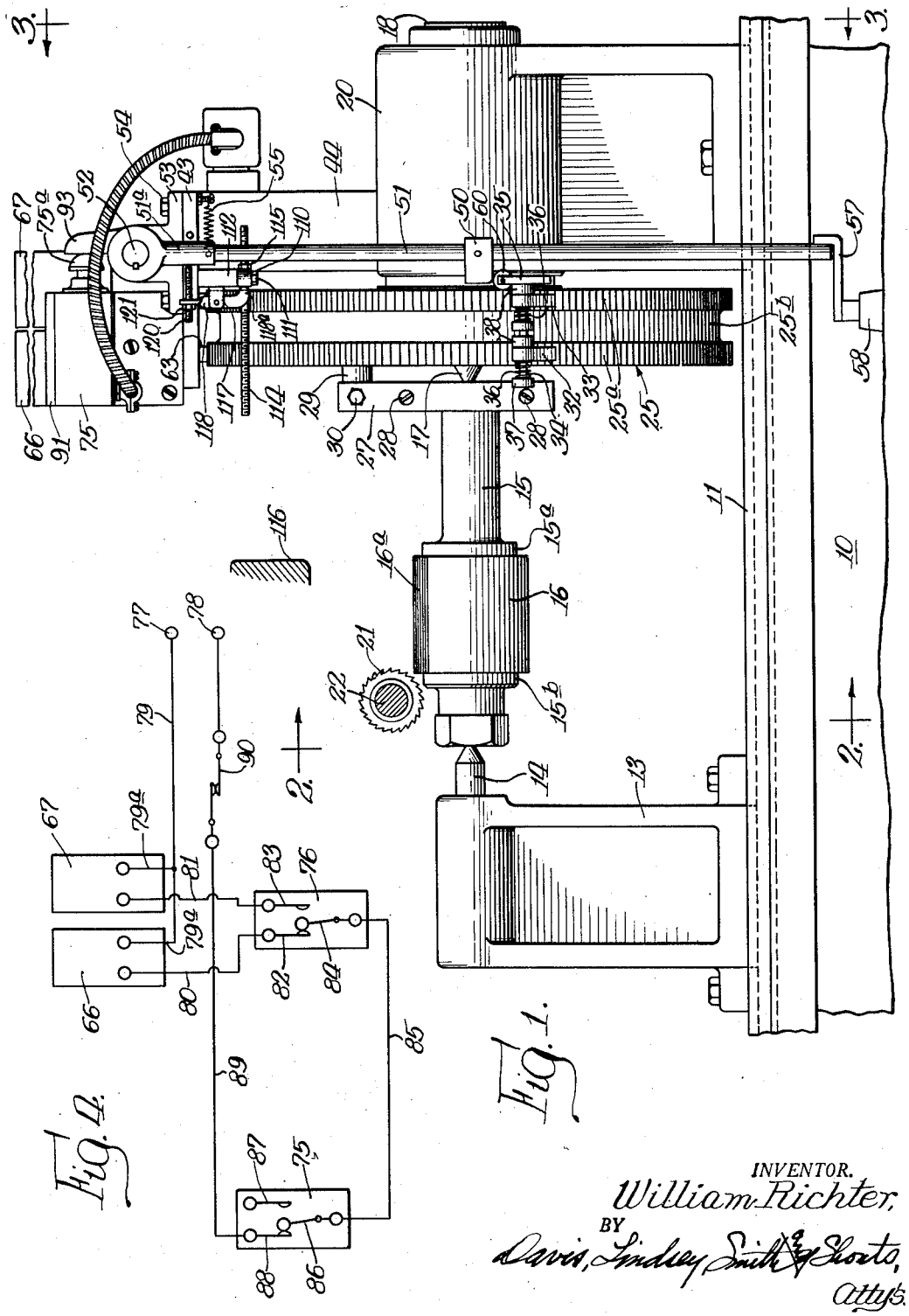
INVENTOR.
William Richter,
BY
Davis, Lindsey, Smith & Shorts,
Attys.

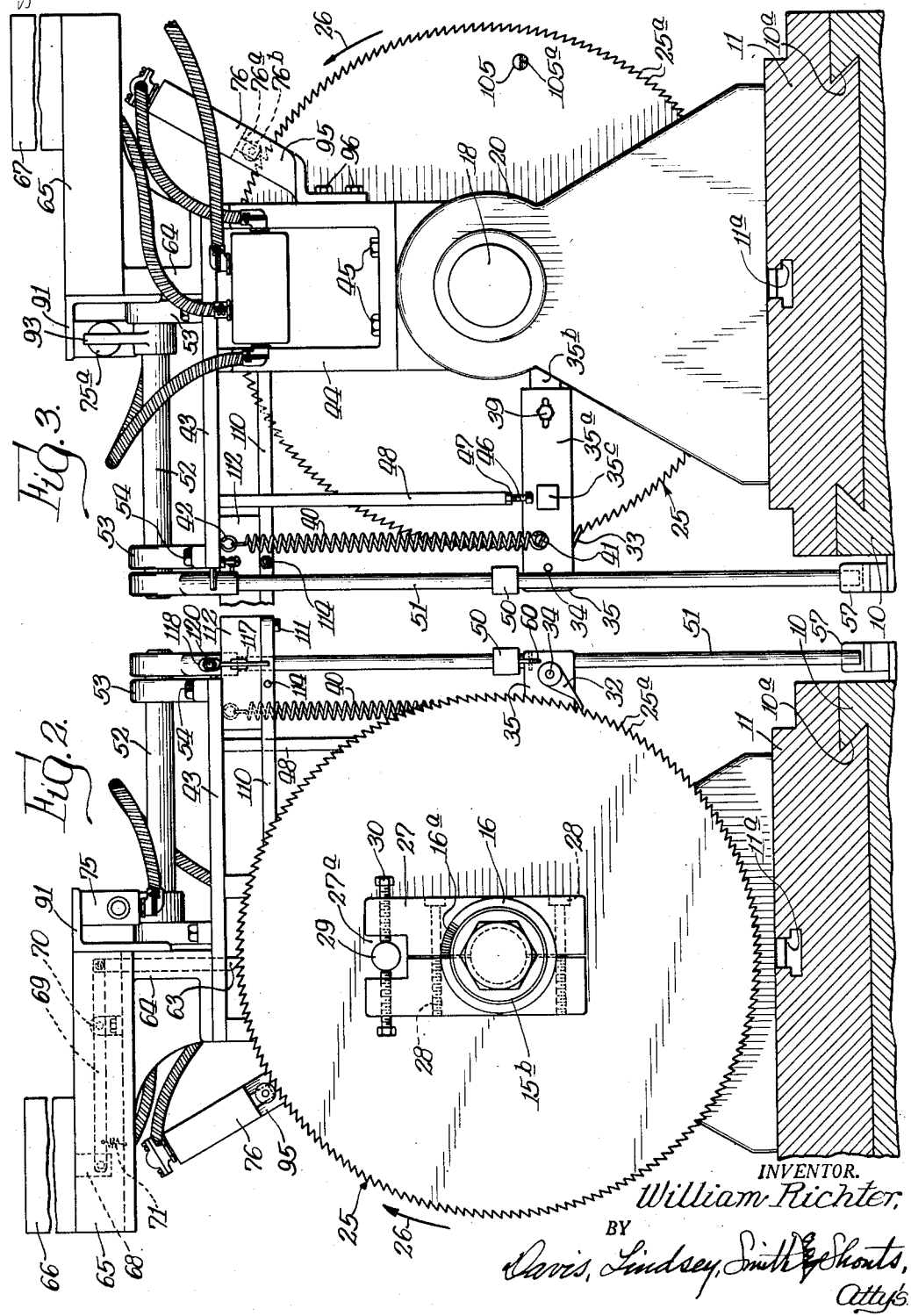

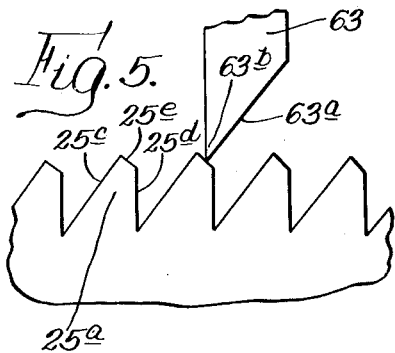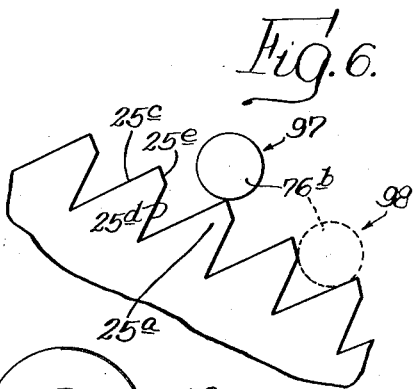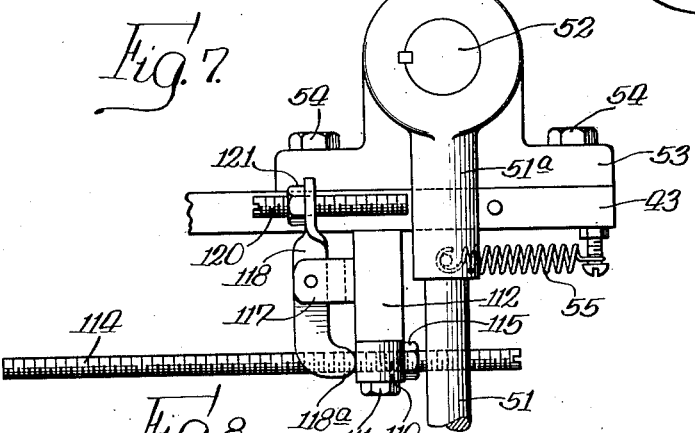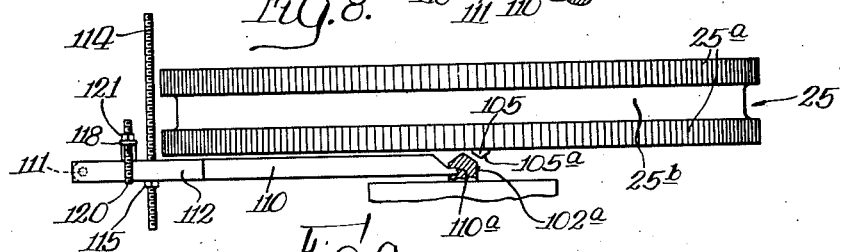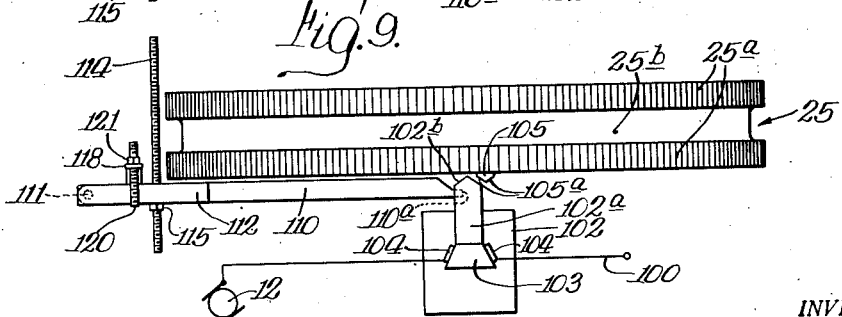

Patented Sept. 14, 1954

2,688,904

UNITED STATES PATENT OFFICE 2,688,904

INDEXING MECHANISM FOR MACHINE TOOLS

William Richter, Kankakee, Ill., assignor to Paramount Textile Machinery Co., Kankakee, Ill., a corporation of Illinois Application February 23, 1946, Serial No. 649,649

14 Claims. (Cl. 90—56)

1

This invention relates to improvements in indexing mechanism for machine tools, such as milling machines and the like, and its purpose is to provide improved means for effecting an automatic and accurate relative adjustment of the work and the cutting tool, after each operation of the cutting tool, in order to effect a predetermined spaced relation of the operations on the work. Such indexing operations are useful and important in connection with the cutting of gear teeth, armature slots, the needle slots of knitting machine cylinders and in various other operations where parts formed by successive machine operations are required to have a definite spaced relation.

The principal object of the present invention is to provide improved indexing mechanism of the type referred to in which the spaced relation of successive operations is determined by one or more indexing wheels of relatively large diameter having teeth spaced substantially greater distances apart than the deformations to be formed by the cutting tool, whereby the indexing teeth may be formed with great accuracy and a very precise spaced relation which is reflected in the corresponding but much lesser spacing of the cutting operations. Another object is to provide improved indexing mechanism for machine tools in which the indexing is effected by a plurality of parallel indexing wheels each provided with accurately formed indexing teeth which are staggered with respect to the teeth of another wheel, whereby relatively large teeth may be employed and may be arranged so that the feeding mechanism which advances the wheels circumferentially will operate alternately or in succession upon the teeth of different wheels, whereby great accuracy is obtained without unduly increasing the size of the indexing wheels. A further object is to provide indexing mechanism comprising a plurality of toothed indexing wheels with pawls for operating them alternately and detents for holding them stationary during the cutting operations, together with means for automatically operating the detents at the proper times to hold the indexing wheels and to release them and permit their feeding movements. Still another object is to provide improved safety mechanism for a motor driven machine tool whereby the

2 motor is automatically stopped if the work table moves more than a predetermined amount in either direction. Other objects relate to various features of construction and arrangement which will appear more fully hereinafter.

The nature of the invention will be understood from the following specification taken with the accompanying drawings in which one embodiment of the invention is illustrated. In the drawings, Figure 1 shows a partial side elevation of a milling machine having applied thereto the indexing mechanism of the present invention;

Fig. 2 shows a transverse vertical section taken on the line 2—2 of Fig. 1;

Fig. 3 shows a transverse vertical section taken on the line 3—3 of Fig. 1;

Fig. 4 shows somewhat diagrammatically the electric circuit connections of the switches and solenoids by which the movements of the indexing wheels are controlled;

Fig. 5 shows an enlarged side elevation of a portion of an indexing wheel and of the pawl which cooperates therewith, illustrating the formation of the teeth;

Fig. 6 shows an enlarged side elevation of a portion of the teeth of one of the indexing wheels illustrating the cooperation therewith of a switch actuating roller by which the circuit connections of certain detent operating solenoids are controlled;

Fig. 7 shows an enlarged side elevation of a portion of the mechanism by which the operation of the driving motor of the machine is arrested in the event that the work table travels too far in either direction;

Fig. 8 shows a partial top plan view and partial section of the switch and lever mechanism by which the operation of the driving motor is arrested at the end of a cycle of operations and also when the work table travels too far in either direction; and Fig. 9 shows a somewhat diagrammatic view of the mechanism illustrated in Fig. 8 and the circuit connection of the electric motor by which the machine is driven.

The invention is illustrated in the drawing as being applied to a milling machine of the "Cincinnati" type manufactured by Cincinnati Milling & Grinding Machines, Inc., of Cincinnati, Ohio, but it will be understood that it may be applied to various other forms of machine tools where it is desired to effect with accuracy the relative adjustment of the work piece and the tool between successive cutting operations of the tool. The milling machine illustrated in the drawings comprises a bed or base 10 upon which there is slidably mounted a table 11 having on its under side a longitudinal extension which engages the undercut groove 10a formed in the base. During the operation of the milling machine the table 11 is periodically reciprocated longitudinally of the base through mechanism, not shown, which is operated by an electric motor 12 shown diagrammatically in Fig. 9. The table 11 has mounted thereon a tail stock 13 carrying a tapered center pin 14 which engages an axial recess in one end of an arbor or chuck 15 which carries the work piece 16 clamped between a stationary collar 15a and a detachable collar 15b. The other end of the arbor 15 has a central aperture which is engaged by the center point 17 carried at the end of the shaft 18 which is mounted to revolve in the dividing head 20. This dividing head is secured in adjusted position on the table 11 by suitable clamping means engaging the longitudinal T-slot 11a formed therein. The work piece 16 is in the form of a hollow cylinder, such as the cylinder of a knitting machine, which is adapted to have formed therein a plurality of equally spaced parallel grooves 16a by the relative movement of the work piece with respect to a cutting tool 21 in the form of a milling cutter mounted upon a transverse power driven spindle 22. The table 11 is adapted to have periodic motion of translation on the base 10 and on each movement thereof toward the left, as viewed in Fig. 1, the cutting tool 21 forms a new slot in the work piece. Between the successive longitudinal movements of the table 11 the work piece 16 is adapted to be rotated a predetermined extent by the indexing mechanism of the present invention in order to bring about the desired uniform spacing of the grooves 16a.

For this purpose the machine is provided with a pair of indexing wheels 25 of relatively large diameter which are provided with relatively large teeth 25a arranged so that the teeth of one wheel are staggered with respect to the teeth of the adjacent wheel. The two wheels are formed as a part of one unitary construction, being separated from each other by the intervening wheel portion 25b, and they are mounted on the shaft 18 to revolve in the direction of the arrow 26. The motion of the indexing wheels is transferred to the chuck or arbor 15 by a split driving block 27 which is clamped on the shank of the arbor 15 by clamping studs 28 and which has a notch 27a embracing a lug 29 which projects from the face of the adjacent indexing wheel. The driving block 27 may be adjusted in fixed relation to the lug 29 by adjusting screws 30 which pass through the driving block on opposite sides of the notch 27a. With this arrangement the motion of the driving wheels is imparted to the chuck or arbor 15 so that when the indexing wheel is rotated angularly a distance equal to one-half the length of one of its teeth, a corresponding motion is imparted to the work piece 16.

The indexing wheels are given intermittent motions at the proper times by pawls 32 and 33 which are pivotally mounted upon a bar 34 projecting laterally from the feeding lever 35 which is pivotally mounted upon a bearing at the side of one of the indexing wheels, which bearing is concentric with the axis of the shaft 18 and of the indexing wheels. A pair of coil springs 36, mounted on the bar 34, engage pressure adjusting collars 37 on this bar and press the pawls 32 and 33 against the teeth of the indexing wheels so that the pawls are held under tension in position to engage the teeth of the indexing wheels 25. The pawls are so arranged that when the end of one pawl is in engagement with the substantially radial face of a tooth on one indexing wheel, the other pawl will be riding on the inclined face of the tooth of the other indexing wheel midway between the points of two teeth. With this arrangement, the pawls are adapted to operate alternately on the teeth of the adjacent indexing wheels.

The feeding lever 35 comprises an outer portion 35a which is adjusted longitudinally on its inner portion 35b through the action of clamping screws 39 engaging elongated slots in the outer portion whereby the effective length of the lever may be adjusted and the pawls 32 and 33 located in the position desired. The lever 35 is normally moved in an upward direction by a coil spring 40 which extends between a screw 41 mounted in the side of the lever and a ring 42 which is secured in the under side of a plate 43 which projects laterally from a rectangular frame member 44 secured to the upper part of the dividing head 20 by studs 45. The extent of the upward movement of the feeding lever 35 is limited by a lug 35c thereon which engages a stop screw 46 secured by a lock nut 47 in the desired adjusted position at the lower end of a bar 48 fixed on the plate 43 and extending downwardly therefrom.

Upon the completion of the reverse stroke of the table 11 toward the right as viewed in Fig. 1, the feeding lever 35 is adapted to be moved downwardly to effect a feeding movement of one of the indexing wheels 25 due to the action of a feeding block or cam 50 carried by a bar 51 which is suspended from a shaft 52 journaled in bearing members 53 secured on the plate 43 by studs 54. This bar 51 is normally moved away from the planes of the indexing wheels by a coil spring 55, shown in Fig. 1, which is connected between a pin on the bar 51 and another pin on the under side of the plate 43, but when the work table 11 reaches the end of its reverse stroke, with the work piece 16 moved out of engagement with the cutting tool 21, the lower end of the bar 51 engages an angular stop member 57 detachably secured on a boss 58 formed on the side of the base 10, thereby rocking the bar 51 and its shaft 52 to cause the feeding block or cam 50 to ride over a feeding roller 60 which is mounted on the upper side of the forward end of the lever 35. The forward lower corner of the member 50 is rounded to permit the ready movement of this member over the roller and this action results in the depression of the feeding lever 35 with the result that one of the pawls 32 or 33 is actuated to feed one of the indexing wheels an angular distance equal to one-half the length of one tooth.

When an indexing wheel 25 has been advanced a distance equal to one-half the length of one of its teeth, it is held in that position during the ensuing cutting operation of the tool 21 brought about by the forward motion of the table 11, by one of the two detents 63 which are mounted to slide vertically in a bracket 64 secured to the previously mentioned plate 43, as shown in Figs. 2 and 3. The bracket 64 supports a housing 65 upon which are mounted two solenoids 66 and 67 which are connected through their detents 63 with the two indexing wheels 25, the solenoid 66 being adapted to operate the detent for the indexing wheel operated by the pawl 32 and the solenoid 67 is associated with the detent which engages the indexing wheel operated by the pawl 33. Each solenoid has a core 68 which is adapted to be elevated when the solenoid is energized and this core extends into the housing 65 and is pivotally connected to a lever 69. The lever 69 is pivoted at an intermediate point on a bracket 70 secured in the housing and the end of the lever opposite the core or plunger 68 is pivoted to the upper end of one of the detents 63. A coil spring 71 is attached to each lever 69 adjacent its core or plunger 68 and the other end of the spring is fixed to a stationary pin so that the spring tends normally to move the core or plunger 68 downwardly and to move the associated detent 63 out of engagement with the teeth of the indexing wheel. The teeth 25a of the indexing wheel preferably have the form shown in Fig. 5 where each tooth is illustrated as comprising an inclined front face 25c, a comparatively steep rear face 25d, and an intermediate inclined face 25e which connects the outer margins of the faces 25c and 25d. Each detent 63 is provided with an inclined end face 63a and the sharp tip 63b of a detent is adapted to engage one of the inclined faces 25e when it is lowered and to slide over this face into engagement with the surface 25d of the teeth so that the indexing wheel is thereby definitely positioned while the relative movement of the table 11 and the cutting tool 21 takes place.

In order that the two detents 63 may be properly operated in timed relation with the actuation of their indexing wheels 25 under the influence of the pawls 32 and 33, the solenoids 66 and 67 are connected in an electric circuit, shown diagrammatically in Fig. 4, which is controlled by two switches 75 and 76. This circuit comprises two terminals 77 and 78 adapted to be connected to a source of supply of electric current and a conductor 79 leads from one terminal 77 through two branch conductors 79a to one terminal of each of the two solenoids 66 and 67. The other terminals of these two solenoids are connected by conductors 80 and 81 to the terminals of the switch 76 where they are connected to the contacts 82 and 83, respectively. The movable contact 84 of this switch is connected by a conductor 85 to the movable contact 86 of the other switch 85. This switch has a dead contact 87 on one side of the movable contact 86 and on the other side of the member 86 there is an active contact 88 which is connected to a conductor 89 leading through the safety switch 90 to the other terminal 78.

As shown in Figs. 1 and 2, the switch 75 is mounted on the under side of an angle bar 91 carried by the bracket 64 and the housing 65. This switch has an actuating plunger 75a, shown in Fig. 1, which is normally actuated by a spring to move outwardly of the switch casing. The rounded head of this plunger 75a engages an actuating lever 93, shown in Fig. 3, which is fixed on the shaft 52 by which the bar 51 is carried. When the table 11 reaches the end of its reverse stroke, toward the right as viewed in Fig. 1, the engagement of the lower end of the bar 51 with the stop 57 and the consequent angular movement of the shaft 52 bring about a corresponding angular movement of the switch lever 93 so that the plunger 75a moves outwardly and causes the movable contact 86 of the switch 75 to engage the dead contact 87, thus opening the circuits of the two solenoids 66 and 67 so that the switch levers 69 are actuated by their springs 71 to move the detents 63 out of engagement with the indexing wheels so that the indexing wheels may then turn freely in response to the actuation of one or the other of the pawls 32 and 33.

As soon as the indexing has been effected, the table 11 begins its forward stroke, whereupon the cam 50 carried by the bar 51 moves out of engagement with the roller 60 and the feeding lever 35 moves upwardly to its normal position determined by the stop member 46. At the same time, the bar 51 is restored to its normal position by the spring 55, thus causing an angular movement of the shaft 52 so that the switch lever 93 is operated to push the switch plunger 75a inwardly, thereby causing the movable contact 86 of the switch to engage the contact 88, thus completing the circuit of one or the other of the solenoids 66 or 67, depending upon the position of the contacts of the switch 76.

The switch 76 is mounted on an inclined bracket 95 secured by studs 96 to the side of the frame member 44, as shown in Fig. 3, and this switch has an actuating plunger 76a having mounted on the end thereof a roller 76b which is adapted to ride upon the outer portions of the teeth of one of the indexing wheels 25. When the roller 76b is contacting with the tip of a tooth 25a, as shown at 97 in Fig. 6, the switch plunger 76a occupies a position wherein the movable contact 84 of the switch engages the stationary contact 82 to complete the circuit of the solenoid 66 and when the roller 76b occupies a position partially between two teeth, as shown by dotted lines at 98 in Fig. 6, the movable contact 84 of the switch engages the other stationary contact 83 and completes the circuit of the other solenoid 67. In this way, the two solenoids 66 and 67 are operated alternately by the switch 76 as the roller 76b alternately engages the tip of the tooth or partially enters the space between two teeth during the rotation of an indexing wheel. Thus, when one pawl 32 operates to move one of the indexing wheels 25, the solenoid 66 is thereafter operated to cause one of the detents 63 to engage a tooth of the associated indexing wheel so that this indexing wheel is promptly held in the position to which it has been moved by its pawl 32 and it remains so held in fixed position until the conclusion of both the forward and reverse strokes of the table 11, whereupon the switch 75 is again actuated by the bar 51 to open the circuit of the solenoid and cause the detent to be restored to its upper position. If, on the other hand, the pawl 32 advances its indexing wheel a distance corresponding to one-half the length of one tooth, the roller 76b assumes a position between two of the teeth 25a, thus moving the contact 84 into engagement with the other contact 83 and energizing the other solenoid 67 so that the other detent 63 then engages a tooth of the indexing wheel which has been operated by the indexing pawl 33 and that indexing wheel is held in fixed position throughout the forward and reverse strokes of the table 11. In this way, the roller 76b of the switch 76, riding on the teeth of one of the indexing wheels, effects an automatic closing of the circuit of the appropriate solenoid to cause a detent to engage the teeth of the indexing wheel which has just been operated.

Due to the staggered arrangement of the teeth of the two indexing wheels, one pawl will engage a tooth of one indexing wheel and advance the wheel a distance equal to one-half the length of a tooth while the other pawl travels idly between the middle point of a tooth and the rear face of the next tooth. On the next stroke of the feeding lever 35, the operations are reversed and the pawl which had an idle motion during the next preceding operation advances the other indexing wheel a distance equal to one-half the length of a tooth. With each such movement of the indexing wheels, the switch operating roller 76b is actuated either by a tip or a depression of one of the indexing wheels to bring about the circuit operations and the alternate operation of the detents which have heretofore been described.

The machine illustrated in the drawings also comprises means for automatically stopping the driving motor by which the table 11 is moved at the end of a cycle of operations, for example, at the end of the completion of the operation of cutting a complete annular series of longitudinal slots or grooves 16a in the work piece 16. For this purpose, the driving motor 12 is connected in an electric circuit shown in Fig. 9 comprising two conductors 100 and 101 leading from a source of supply with one of these conductors having connected therein a switch 102 which is adapted to be operated to open the circuit at the end of a cycle of operations and also when there is any excess travel of the table 11 in either direction. The switch 102 is mounted on the upper part of the U-shaped frame member 44, as shown in Fig. 3, and it has a plunger 102a with a contact 103 which is adapted to connect and disconnect the contacts 104 which are connected in the circuit between the motor 12 and the conductor 100. The plunger 102a is provided at its end with tapered surfaces 102b which are adapted to be engaged by the inclined end surfaces 105a formed on a switch actuating pin 105 which is secured to the face of the adjacent indexing wheel 25, as shown particularly in Figs. 3 and 9. At the commencement of the operation upon a particular work piece 16, the indexing wheels are located so that the pin 105 will lie adjacent to the actuating plunger 102a of the switch and then, after a complete revolution of the indexing wheels and a corresponding complete operation on the work piece, an inclined face of the pin 105 will engage the other side of the tapered end of the plunger 102a and thus force the plunger inwardly to disconnect the contacts 104 and thereby open the circuit of the motor 12.

The switch 102 is also employed for the purpose of opening the motor circuit in response to any undue movement of the table 11 at the ends of its travel. For this purpose, there is provided a switch operating lever 110 which is pivoted by a stud 111 on the under side of a block 112 which is fixed to the under side of the plate 43, as shown particularly in Figs. 1, 2 and 3. The lever 110 is provided at its end with a pin 110a which engages a recess in the side of the switch plunger 102a, as shown in Figs. 8 and 9, and this lever has mounted in a threaded aperture in an intermediate part thereof a horizontally extending threaded actuating rod 114 which is held in adjusted position by a set screw 115 and which is adapted, upon extreme movement of the table 11 toward the left as viewed in Fig. 1, to engage a stationary part 116 of the machine and thereby actuate the lever 110 about its pivot 111 so that the plunger 102a is thereby operated to open the switch 102. For the purpose of opening the switch 102 upon extreme movement of the table 11 toward the right, as viewed in Fig. 1, the block 112 is provided with a bracket 117 having pivotally mounted therein a lever 118 which has a curved lower extremity 118a adapted to engage the side of the lever 110 between its pivot and the switch plunger. The upper end of the lever 118, above the bracket 117, is provided with a threaded aperture engaged by another threaded actuating member 120 which is held in adjusted position by a lock nut 121. The right-hand end of this actuating member 120 normally does not move into engagement with the upper enlarged part 51a of the rod 51 but if there is an extreme movement of the table 11 toward the right, due to a failure of the controlling mechanism to operate properly or for any other reason, the actuating member 120 will engage the part 51a of the bar 51 and rock the lever 118 about its pivot so that it will actuate the switch lever 110 to open the switch 102 and thereby stop the motor 12.

It will be apparent that the advantages of the invention may be obtained, not only with different forms of machine tools, but also with machines of various sizes, inasmuch as the indexing wheels 25 may be interchanged with other wheels of different diameter or having different tooth formations and the tail stock 13, dividing head 20, driving block 27, and arbor or chuck 15 may be relatively adjusted and interchanged with other parts in order to bring about the desired automatic operation with work pieces of various kinds and sizes.

Although one form of the invention has been shown and described by way of illustration, it will be understood that it may be constructed in various other embodiments which come within the scope of the appended claims.

I claim:

1. An indexing mechanism for machine tools comprising, a pair of toothed indexing wheels arranged to rotate a work piece, the teeth of each wheel being staggered with respect to those of the other wheel, pawls for operating said toothed wheels, and means for operating said pawls to actuate said wheels alternately.

2. An indexing mechanism for machine tools comprising, a pair of toothed indexing wheels arranged to rotate a work piece, the teeth of each wheel being staggered with respect to those of the other wheel, pawls for operating said toothed wheels, and a member carrying both of said pawls and actuated periodically to drive said pawls into alternate engagement with the teeth of said wheels to rotate said wheels step-by-step into successive indexing positions.

3. An indexing mechanism for machine tools comprising, a toothed indexing wheel arranged to rotate a work piece, means including a pawl for intermittently rotating said wheel, a detent adapted to engage said teeth to hold said wheel against rotation, a solenoid for operating said detent, an electric circuit for said solenoid, a switch connected in said circuit, and a cam controlled by said teeth for intermittently actuating said switch thereby to energize said solenoid and intermittently operate said detent into engagement with said teeth.

4. An indexing mechanism for machine tools comprising, a pair of toothed indexing wheels arranged to rotate a work piece, the teeth of each wheel being staggered with respect to those of the other wheel, pawls each positioned for operating a separate one of said toothed wheels, a common means for operating said pawls to cause them to act alternately to engage the teeth of said wheels, and means separate from said pawls for holding each wheel against rotation after the operation thereof by its pawl.

5. An indexing mechanism for machine tools comprising, a pair of toothed indexing wheels arranged to rotate a work piece, the teeth of each wheel being staggered with respect to those of the other wheel, pawls each positioned for operating a separate one of said toothed wheels, means for operating said pawls to cause them to act alternately to engage the teeth of said wheels, a pair of detents each adapted to hold one of said wheels against rotation, and cam means actuated by the teeth of one of said wheels for alternately controlling the operation of each of said detents.

6. An indexing mechanism for machine tools comprising, a pair of toothed indexing wheels arranged to rotate a work piece, the teeth of each wheel being staggered with respect to those of the other wheel, pawls each positioned for operating a separate one of said toothed wheels, means for operating said pawls to cause them to act alternately to engage the teeth of said wheels, a pair of detents each adapted to hold one of said wheels against rotation, a pair of solenoids each arranged to actuate one of said detents, an electric circuit for said solenoids, and a switch having an operating member riding on the teeth of one of said indexing wheels for closing said circuit to operate one of said solenoids immediately after the associated indexing wheel has been operated by its pawl.

7. An indexing mechanism for machine tools comprising, a pair of toothed indexing wheels arranged to rotate a work piece, the teeth of each wheel being staggered with respect to those of the other wheel, pawls each positioned for operating a separate one of said toothed wheels, means for operating said pawls to cause them to act alternately in rotating said wheels, a pair of detents each adapted to hold one of said wheels against rotation, means for normally retracting said detents from said indexing wheels, a pair of solenoids each adapted when energized to move one of said detents into engagement with the teeth of its indexing wheel, an electric circuit for said solenoids, and a switch having an operating member riding on the teeth of one of said indexing wheels whereby the said circuit is operated to energize said solenoids alternately.

8. An indexing mechanism for machine tools comprising, a pair of toothed indexing wheels arranged to rotate a work piece, the teeth of each wheel being staggered with respect to those of the other wheel, pawls each positioned for operating a separate one of said toothed wheels, means for operating said pawls to cause them to act alternately in rotating said wheels, a pair of detents each adapted to hold one of said wheels against rotation, means for normally retracting said detents from said indexing wheels, a pair of solenoids each adapted when energized to move one of said detents into engagement with the teeth of its indexing wheel, an electric circuit for said solenoids, a switch having an operating member riding on the teeth of one of said indexing wheels whereby the said circuit is operated to energize said solenoids alternately, and a second switch controlled by each operation of said pawl operating means for opening said circuit preceding each working stroke of one of said pawls and for preparing said circuit to be closed by said first named switch after the pawl has operated.

9. An indexing mechanism for machine tools comprising, a pair of toothed indexing wheels for rotating a work piece, the teeth of one wheel being staggered with respect to the teeth of the other wheel, a pair of pawls each arranged to engage the teeth of a separate one of said wheels, and means for actuating said pawls to cause said pawls to act alternately to rotate said wheels alternately by increments each equal to one-half the distance between successive teeth on one of said wheels.

10. A reciprocating indexing mechanism for machine tools comprising, a pair of toothed indexing wheels for rotating a work piece, the teeth of one wheel being staggered with respect to the teeth of the other wheel, a pair of pawls each arranged to engage the teeth of a separate one of said wheels, a lever upon which said pawls are mounted, a lever operating cam, and a member carrying said cam and actuated by the reciprocating movement of said mechanism to cause said cam to actuate said lever and said pawls.

11. A reciprocating indexing mechanism for machine tools comprising, a pair of toothed indexing wheels for rotating a work piece, the teeth of one wheel being staggered with respect to the teeth of the other wheel, a pair of pawls each arranged to engage the teeth of a separate one of said wheels, a lever on which said pawls are mounted, a lever operating cam, a member carrying said cam and actuated by the reciprocating movement of said mechanism to cause said cam to actuate said lever and said pawls, means normally retracting said cam carrying member, and means for adjusting the normal position of said cam carrying member.

12. A reciprocating indexing mechanism for machine tools comprising, a pair of toothed indexing wheels for rotating a work piece, the teeth of one wheel being staggered with respect to the teeth of the other wheel, a pair of pawls each arranged to engage the teeth of a separate one of said wheels, a lever having said pawls mounted thereon, a bar suspended from a pivot, a cam mounted on said bar and adapted to move said lever to actuate said pawls, and a stationary stop positioned to be engaged by said bar in response to an overthrow movement of said reciprocating mechanism for rocking said bar about its pivot to control said cam to actuate said lever.

13. An indexing mechanism for machine tools comprising, a toothed indexing wheel arranged to rotate a work piece, each tooth of said wheel having a sharply inclined face and a more gradually sloping face connected by an intermediate inclined face, means for imparting intermittent rotary motion to said wheel, a detent adapted to engage one of said intermediate faces of a tooth and then to move into the space between two of said teeth to position said wheel accurately after rotary motion thereof, and means for actuating said detent.

14. An indexing mechanism for machine tools comprising, a toothed indexing wheel arranged to rotate a work piece, each tooth of said wheel having a sharply inclined face and a more gradually sloping face connected by an intermediate inclined face, means for imparting intermittent rotary motion to said wheel, a detent adapted to engage one of said intermediate faces of a tooth and then to move into the space between two of said teeth to position said wheel accurately after rotary motion thereof, and means actuated by engagement with said teeth for actuating said detent.

References Cited in the file of this patent

UNITED STATES PATENTS

| Number | Name | Date |
|---|---|---|
| 362,082 | Holz et al. | May 3, 1887 |
| 1,061,973 | Bilton | May 20, 1913 |
| 1,289,863 | Mitchell | Dec. 31, 1918 |
| 1,381,514 | Soker | June 14, 1921 |
| 1,719,601 | Eisenberg | July 2, 1929 |
| 1,925,384 | Huern | Sept. 5, 1933 |
| 1,964,799 | Hill et al. | July 3, 1934 |
| 2,094,484 | Bennett | Sept. 28, 1937 |
| 2,187,544 | Laessker | Jan. 16, 1940 |
| 2,209,029 | Kriegbaum et al. | July 23, 1940 |
| 2,217,671 | Coffin et al. | Oct. 15, 1940 |
| 2,261,052 | Coffin et al. | Oct. 28, 1941 |
| 2,386,880 | Osplack | Oct. 16, 1945 |
| 2,467,574 | Williams | Apr. 19, 1949 |
| 2,592,821 | Powell | Aug. 15, 1952 |

FOREIGN PATENTS

| Number | Country | Date |
|---|---|---|
| 139,124 | Great Britain | Feb. 26, 1920 |